United States Patent
Lüer et al.

(10) Patent No.: US 8,128,744 B2
(45) Date of Patent: Mar. 6, 2012

(54) AQUEOUS COATING COMPOSITION, METHOD FOR PRODUCTION OF THE SAME, AND USE THEREOF

(75) Inventors: Ingo Lüer, Münster (DE); Egon Wegner, Greven (DE)

(73) Assignee: BASF Coating GmbH, Munster (DE)

( * ) Notice: Subject to any disclaimer, the term of this patent is extended or adjusted under 35 U.S.C. 154(b) by 0 days.

(21) Appl. No.: 12/919,562

(22) PCT Filed: Feb. 13, 2009

(86) PCT No.: PCT/EP2009/001044
§ 371 (c)(1),
(2), (4) Date: Aug. 26, 2010

(87) PCT Pub. No.: WO2009/100938
PCT Pub. Date: Aug. 20, 2009

(65) Prior Publication Data
US 2011/0042623 A1   Feb. 24, 2011

(30) Foreign Application Priority Data
Feb. 15, 2008 (DE) .......................... 10 2008 009 481

(51) Int. Cl.
*C09D 1/04* (2006.01)
(52) U.S. Cl. .............. 106/14.14; 106/14.15; 106/14.35; 106/14.37; 106/14.39; 106/600; 523/200; 523/402; 523/426; 524/501
(58) Field of Classification Search .................. 252/500; 524/241, 439, 501, 577; 106/14.14, 14.15, 106/14.35, 14.37, 14.39, 600; 523/200, 402, 523/426
See application file for complete search history.

(56) References Cited

U.S. PATENT DOCUMENTS

| | | | |
|---|---|---|---|
| 6,727,310 B2 * | 4/2004 | Mizutani et al. | 524/439 |
| 7,842,751 B2 * | 11/2010 | Nakane et al. | 524/577 |
| 2004/0039097 A1 | 2/2004 | Nagano et al. | |

FOREIGN PATENT DOCUMENTS

| | | |
|---|---|---|
| DE | 3545618 A1 | 6/1987 |
| DE | 4009858 A1 | 10/1991 |
| DE | 4010176 A1 | 10/1991 |
| DE | 4028386 A1 | 3/1992 |
| DE | 4437535 A1 | 4/1996 |
| DE | 19928235 A1 | 4/2000 |
| DE | 19945574 A1 | 4/2001 |
| DE | 19948004 A1 | 7/2001 |
| DE | 102006020190 A1 | 11/2007 |
| EP | 0158099 A2 | 10/1985 |
| EP | 0228003 A1 | 7/1987 |
| EP | 0596460 A2 | 5/1994 |
| EP | 1153989 A1 | 11/2001 |
| WO | WO9924485 A2 | 5/1999 |
| WO | WO2004024837 A1 | 3/2004 |
| WO | WO2005049745 A1 | 6/2005 |
| WO | WO2006041658 A1 | 4/2006 |
| WO | WO2007119762 | * 10/2007 |

OTHER PUBLICATIONS

DE 4028386 machine translation.*
International Preliminary Report on Patentability for International application No. PCT/EP2009/001044 dated Aug. 17, 2010.
International Search Report for International Application No. PCT/EP2009/001044 dated Apr. 29, 2009.
Written Opinion for International Application No. PCT/EP2009/001044 dated Apr. 29, 2009.
"Rheology Modification, The role of rheology modifiers" Processing Efficiency—Solutions & Technologies; BASF—The Chemical Company; Sep. 21, 2011; pp. 1-2; http://www.dispersions-pigments.basf.com/portal/basf/ien/dt.jsp?setCursor=1_556343.

* cited by examiner

*Primary Examiner* — Mark Kopec
*Assistant Examiner* — Haidung Nguyen
(74) *Attorney, Agent, or Firm* — Cantor Colburn LLP

(57) ABSTRACT

Water-based coating composition comprising at least one resin composition for a water-based coating composition and as a rheological assistant at least one polyamide and at least one acrylate thickener based on poly(meth)acrylic acid.

21 Claims, No Drawings

AQUEOUS COATING COMPOSITION, METHOD FOR PRODUCTION OF THE SAME, AND USE THEREOF

CROSS REFERENCE TO RELATED APPLICATIONS

This application is a National Phase Application of Patent Application PCT/EP2009/001044 filed on 13 Feb. 2009, which claims priority to DE 102008009481.1, filed 15 Feb. 2008, both of which are hereby incorporated by reference in their entirety.

FIELD OF THE INVENTION

The present invention relates to a new, water-based coating composition. The invention further relates to a process for preparing the coating composition. The invention additionally relates to the use of the coating composition.

BACKGROUND OF THE INVENTION

In automotive finishing in particular, though also in other sectors where there is a desire for coatings featuring a good decorative effect and at the same time affording good protection against corrosion, it is known to provide substrates with two or more coating films arranged atop one another.

Multicoat paint systems are applied preferably in accordance with what is called the basecoat/clearcoat process; that is, a pigmented basecoat material is applied first and, following a short flash-off time without a baking step (wet-on-wet process), is coated over with a clearcoat material. Subsequently, basecoat and clearcoat are baked together.

The basecoat/clearcoat process has acquired particular importance in connection with the application of automotive metallic effect finishes.

Economic and environmental considerations have resulted in attempts to use aqueous basecoating compositions in the production of multicoat finishes.

The coating compositions for producing these basecoat films must be capable of being processed by the nowadays customary, rational wet-on-wet process: that is, following a very short initial drying period without a baking step, they must be capable of being coated over with a transparent topcoat, without exhibiting defects in their visual appearance, such as, for example, those known as pinholes.

Furthermore, the coating material must also exhibit sufficient stability on storage. A typical test is the storage of the material at 40° C.

With metallic effect coatings of the basecoat/clearcoat type, furthermore, there are also other problems to be solved. The metallic effect is critically dependent on the orientation of the metallic pigment particles in the coating film. A metallic effect basecoat material that can be processed in the wet-on-wet process, accordingly, must give coating films in which the metallic pigments, following application, are present in a favorable spatial orientation, and in which this orientation is fixed so quickly that it cannot be disrupted in the course of the further coating operation. Parameters suitable for characterizing the metallic effect are the lightness of the hue, and the flop index.

The laid-open specification DE 40 28 386 A1 discloses water-thinnable coating compositions which comprise a water-dilutable polyurethane resin binder, pigment particles, a thickener, and a polyamide rheological assistant. Coating materials of this kind exhibit an inadequate metallic effect and an increased tendency toward sedimentation after storage at elevated temperature (40° C.).

US 2004/0039097 A1 discloses a water-based metallic coating material that likewise comprises polyamide rheological assistants.

EP 1 153 989 A1 discloses a water-based, metallic coating composition which as well as a resin composition and a pigment is also composed of metal silicate and a polyamide resin rheological assistant. Depending on the binder combination, however, the presence of phyllosilicates can lead to pinholes.

It is an object of the present invention to provide a new coating composition that does not have the disadvantages of the prior art. This composition is to have improved application properties. Thus pinhole formation is to be reduced without a negative influence on the metallic effect. Furthermore, the sedimentation stability of the composition is to be ensured.

The terms "pinholes" and "metallic effect" are known to the skilled worker and defined, for example, in Römpp Lexikon, Lacke and Druckfarben, Georg Thieme Verlag 1998.

Surprisingly it has been found that this object can be achieved through the combination of polyamides and poly(meth)acrylic acids as rheological assistants.

SUMMARY OF THE INVENTION

The present invention accordingly provides a water-based coating composition comprising at least one resin composition for a water-based coating composition and as rheological assistants at least one polyamide and at least one acrylate thickener based on poly(meth)acrylic acid. Preferably the acrylate thickener is a polyacrylic acid.

DETAILED DESCRIPTION OF AN EMBODIMENT OF THE INVENTION

Poly(meth)acrylic acids are conventional, known compounds and are sold by, for example, the company Ciba Specialty Chemicals under the brand name Viscalex®.

Polyamides are organic compounds which contain at least two amide structures in the molecule. Compounds of this kind can be prepared by reacting polycarboxylic acids with polyamines and/or monoamines, or by reacting polyamines with monocarboxylic and/or polycarboxylic acids. Polyamides which are prepared by reacting polyamines with fatty acids, more particularly polyamides which are obtained by reacting polyamines with fatty acids containing 16 to 20 C atoms per molecule, are used with preference. Particular preference is given to the reaction product of 12-hydroxystearic acid and 1,6-hexanediamine. A suitable commercially available polyamide thickener is available, for example, under the trade name Disparlon® AQ 630 (manufacturer: Kusumoto, Japan).

The coating compositions of the invention contain generally 0.5% to 15% by mass of rheological assistants, based on the total binder solids. In the cases where there are no metallic pigments present, 0.5% to 10% by mass, preferably 1.5% to 8% by mass, of rheological assistants are used, based on the total binder solids. Coating compositions which do contain metallic pigment use 2% to 15% by mass, preferably 4% to 12% by mass, of rheological assistants, based on the total binder solids.

The mass ratio of polyamide to acrylate thickener is 10:1 to 1.5:1, preferably 7:1 to 3:1.

The coating compositions of the invention can comprise at least one further rheological assistant. Preferably this rheological assistant is selected from the group consisting of polyurethane-based associative thickeners, carboxymethylcellulose acetobutyrate thickeners, metal silicate, and silica. The further rheological assistant is preferably a metal silicate.

The mass ratio of the solids fractions of polyamide to acrylate thickener to further thickener is 12:1:1 to 1:0.5:1, preferably 7:1:1 to 3:0.5:1.

The metal silicate is preferably selected from the group of the smectites. Particular preference is given to selecting the smectites from the group of the montmorillonites and hectorites. More particularly the montmorillonites and hectorites are selected from the group consisting of aluminum magnesium silicates and also sodium magnesium and sodium magnesium fluorine lithium phyllosilicates. The inorganic phyllosilicates are sold by, for example, the company Rockwood under the brand name Laponite®. The mass fraction of metal silicate is preferably not higher than 2.5% by mass, based on the total binder solids.

The polyurethane-based associative thickener is disclosed in, for example, DE 199 45 574 A1. The polyurethane-based associative thickeners are also conventional, known compounds and are sold by, for example, the company Henkel under the brand name Nopco®. Carboxymethylcellulose acetobutyrate thickeners are sold by, for example, the company Eastman under the name CMCAB 641-0,2; silicas are sold, for example, under the name Aerosil® by the company Evonik.

The coating compositions of the invention may also comprise further typical additions such as fillers, plasticizers, stabilizers, wetting agents, dispersing assistants, flow control agents, defoamers, and catalysts, individually or in a mixture.

The coating compositions of the invention may comprise at least one color and/or effect pigment. Examples include titanium dioxide, graphite, carbon black, phthalocyanine blue, chromium oxide, and perylenetetracarboximides. The color and/or effect pigments are preferably selected from the group consisting of organic and inorganic, coloring, extending, rheology-controlling, optical-effect-imparting, electrically conductive, magnetically shielding, and fluorescent pigments, metallic pigments and metal powders, organic and inorganic, transparent or hiding fillers, and nanoparticles. Preference is given to a coating composition which comprises a metallic pigment. With particular preference the metallic pigment is selected from the group consisting of aluminum, bismuth oxychloride, mica, titanium oxide-coated mica, iron oxide-coated mica, micaceous iron oxide, titanium oxide-coated silica, titanium oxide-coated aluminum, iron oxide-coated silica, and iron oxide-coated aluminum. Where further color pigments are present in the coating compositions of the invention, as well as the metallic pigments, the nature and amount of the color pigments are selected such that the desired metallic effect is not suppressed. The mass fraction of the metal powder, based on the total binder solids, is up to 32% by mass, preferably 12% to 28% by mass.

The invention also embraces coating compositions without metallic pigment. These compositions are referred to as solid-color basecoat or solid-color topcoat materials.

The coating compositions of the invention comprise water as a liquid diluant, which where appropriate may also contain organic solvents. The fraction of organic solvents is kept as low as possible.

Examples of solvents which may be present in the water include heterocyclic, aliphatic or aromatic hydrocarbons, mono- or polyfunctional alcohols, ethers, esters, ketones, and amides, such as N-methylpyrrolidone, N-ethylpyrrolidone, dimethylformamide, toluene, xylene, butanol, ethyl glycol, and butyl glycol, and also their acetates, butyl diglycol, diethylene glycol dimethylether, cyclohexanone, methyl ethyl ketone, acetone, isophorone or mixtures thereof.

A resin composition for a coating composition of the invention comprises a binder, which may be in dispersion or solution in water, and a crosslinking agent. Examples of water-dilutable binders that can be used include water-dilutable polyacrylates, water-dilutable polyesters, water-dilutable polyethers, water-dilutable melamine resins and urea resins, and water-dilutable polyurethane resins, of the kind disclosed, for instance, in EP 0 158 099 A2.

Preferred coating compositions are those comprising water-dilutable polyurethane resin binders. Particularly preferred coating compositions are obtained using polyurethanes which contain at least one pendant and/or at least one terminal ethenylarylene group. These aqueous binders are described in, for example, the German laid-open specification DE 199 48 004 A1.

Particular preference is given, furthermore, to coating compositions which comprise polyurethane resins that have an acid number of 5 to 70. These are disclosed in, for example, the German laid-open specification DE 035 45 618 A1.

The coating compositions comprising polyurethane resins advantageously comprise a water-dilutable melamine resin as an additional binder component. Particularly advantageous is a fraction of 1% to 80% by mass, with very particular advantage 30% to 70% by mass, based on the fraction of the water-dilutable polyurethane resin. Water-dilutable melamine resins are, for example, etherified melamine-formaldehyde condensation products. Their solubility in water is dependent—apart from on the degree of condensation, which is to be as low as possible—on the etherifying component, with only the lowest members of the alkanol or ethylene glycol monoether series producing water-soluble condensates. The greatest importance is possessed by the melamine resins that are etherified with methanol. If solubilizers are used, it is also possible for butanol-etherified melamine resins to be dispersed in aqueous phase.

A further possibility is to insert carboxyl groups into the condensate. Transetherification products of highly etherified formaldehyde condensates with hydroxycarboxylic acid are water-soluble by way of their carboxyl group, after neutralization, and may be present in the coating compositions of the invention.

In place of the melamine resins described it is also possible to use other water-soluble or water-dispersible amino resins, such as urea resins, for example.

If the coating composition comprises a melamine resin, it may advantageously further comprise, as a further binder component, a water-dilutable polyester resin and/or a water-dilutable polyacrylate resin. The mass ratio in the case of melamine resin to polyester/polyacrylate resin is preferably 2:1 to 1:4, and the mass ratio of melamine resin plus polyester and/or polyacrylate resin to polyurethane resin is preferably 4:1 to 1:4, more preferably 2:1 to 1:2, very preferably 1.3:1 to 1:1.3. Water-dilutable polyester resins used are preferably saturated and unsaturated polyester resins that carry hydroxyl groups, of the kind mentioned, for instance, in the laid-open specifications DE 40 28 386 A1 and DE 44 37 535 A1.

The polyester resins preferably contain no polymerizable double bonds. Polyester diols are particularly preferred. Very particular preference is given to polyester diols having a number-average molecular weight of 400 to 5000.

As their solubilizing groups, the polyester resins used in accordance with the invention preferably contain carboxylate groups.

As a water-dilutable polyacrylate resin it is preferred to use a polyurethane-modified polyacrylate. This is disclosed in, for example, the laid-open specification DE 44 37 535 A1.

The coating compositions of the invention contain 5% to 30% by mass, preferably 10% to 25% by mass, of water-dilutable binder constituents.

Examples of suitable crosslinking agents are amino resins, resins or compounds containing anhydride groups, resins or compounds containing epoxide groups, tris(alkoxycarbonylamino)triazines, resins or compounds containing carbonate groups, blocked and/or nonblocked polyisocyanates, beta-hydroxyalkylamides, and also compounds having on average at least two groups capable of transesterification, examples being reaction products of malonic diesters and polyisocyanates or of esters and partial esters of polyhydric alcohols of malonic acid with monoisocyanates, of the kind described in European patent EP 0 596 460 A1.

Where nonblocked polyisocyanates are selected as crosslinking agents, the water-based coating composition of the invention is formulated as a two-component composition. Crosslinking agents of this kind are well known to the skilled worker and are offered as commercial products by numerous companies.

The mass fraction of the binder to the crosslinking agent is preferably 50% to 90% by mass, based on the total amount of both components. A range from 65% to 85% by mass is preferred.

The present invention further relates to a process for preparing the coating compositions of the invention.

The coating composition of the invention can be prepared by mixing and dispersing the respective components of the coating composition, which have been described above, in a water-based medium, making use, for example, of high-speed stirrers or off-line or in-line dissolvers.

The present invention relates, moreover, to the use of the coating compositions of the invention as a paint system on articles to be coated, such as metal or plastics bodies and parts thereof for automobiles such as passenger cars, trucks, motorbikes, and buses, and metal or plastics parts of household electrical products, either directly or after the prior application of a primer coating composition, such as a cationically electrodepositable coating composition, and, where necessary, an intermediate coating composition to the articles that are to be coated, and subsequent curing of these coating films. The coating composition is preferably applied as a paint system to automobile bodies and parts thereof. Beforehand the metallic articles to be coated are preferably subjected to a chemical conversion treatment using phosphates and chromates. Furthermore it is possible for known, conventional materials to be employed as undercoating compositions and as intermediate coating compositions.

The coating composition of the invention can be coated onto these articles to be coated (including those which have been coated with the undercoating composition and which additionally, in a suitable way, have been coated with the intermediate coating composition) by means of electrostatic coating, by means of air spray coating and by means of airless spray coating. The thickness of its coating film falls appropriately into a range from customarily 5 to 35 μm, more particularly 10 to 25 μm, as the cured coating film. The coating film can be cured by heating it at about 100 to about 180° C. for about 10 to about 40 minutes.

In the coating film formed from the coating composition of the invention comprising metallic pigments, the metallic pigments are aligned uniformly on the coated surface and parallel to the coated surface, and the flip-flop properties of the coating film obtained are excellent as compared with those of a conventional metallic coating film. Further factors are that the pronounced effect is maintained, that these metallic pigments are uniformly dispersed, and that virtually no metallic marbling is observed.

A clear coating composition can be coated onto the coating film of the coating composition of the invention after the latter has been cured or without it being cured, i.e., onto a coated side thereof, by a "2 coat 1 bake" (2C1B) process or a "2 coat 2 bake" (2C2B) process.

The coating materials of the invention are additionally suitable for use in a dual application (wet on wet coating) to which, after brief preliminary drying, a clearcoat material is applied, which is baked together with the films coated first (3C1B).

The clear coating composition can be applied by first applying the coating composition of the invention to the article to be coated, in the manner described above, and by applying the clear coating composition, with a solids content in the coating composition controlled to about 30% to about 80% by mass, to a coated surface thereof by electrostatic coating, air spray coating, and airless spray coating, after the curing of a coating film thereof by heating, or in the uncured state. The film thickness of the clear coating composition falls suitably within a range from customarily 5 to 100 μm, more particularly 20 to 80 μm, based on the cured coating film. The coating film can be cured by heating it at about 100 to about 180° C. for about 10 to about 40 minutes.

The invention is illustrated below with reference to working examples.

EXAMPLES

The "parts" specified below in a composition are to be understood as "mass fractions".

I. Aqueous Metallic Basecoat Material
Ia. Preparation of the Coating Materials

Example 1

17.5 parts of an aqueous binder dispersion according to DE19948004 A1, page 20, lines 9 to 21 are mixed with vigorous stirring with 27 parts of a 3% aqueous dispersion of Laponite® RD. With stirring, 4.5 parts of an acrylate-modified polyurethane resin according to DE4437535 A1, page 7, line 55 to page 8, line 23, 1.8 parts of a solution of 50 parts Surfynol® 104 (Air Products) and 50 parts butyl glycol, and also 4.5 parts of the melamine resin Luwipal® 052 (BASF), 2 parts of butyl glycol, and 4 parts of the polyester described in DE4009858 A1, column 16, lines 37-59 are added.

Subsequently a smoothly stirred mixture of 5.4 g of the aluminum pigment Stapa® Hydrolux 2192 (Eckart) in 8 parts of butyl glycol is added. The pH is adjusted to 8.0 with a dimethylethanolamine solution (10% strength in water) and the viscosity is adjusted to 70 mPas at $1000\ s^{-1}$ and 23° C. with water (Rheolab MC1 from Physica, Z2 measuring system).

Example 2

17.5 parts of an aqueous binder dispersion described in DE19948004 A1, page 20, lines 9 to 21 are admixed with stirring with 4.5 parts of an acrylate-modified polyurethane resin (DE4437535 A1, page 7, line 55 to page 8, line 23), 1.8 parts of a solution of 50 parts Surfynol® 104 (Air Products) and 50 parts butyl glycol, and also 4.5 parts of the melamine resin Luwipal® 052 (BASF), 2 parts of butyl glycol, 4 parts of the polyester described in DE4009858 A1, column 16, lines 37-59, and 30 parts of a 20%, aqueous premix of the polyamide thickener Disparlon® AQ 630 in water.

Subsequently a smoothly stirred mixture of 5.4 g of the aluminum pigment Stapa® Hydrolux 2192 (Eckart) in 8 parts of butyl glycol is added. The pH is adjusted to 8.0 with a dimethylethanolamine solution (10% strength in water) and the viscosity is adjusted to 70 mPas at 1000 s$^{-1}$ and 23° C. with water (Rheolab MC1 from Physica, Z2 measuring system).

Example 3

Inventive Example 17.5 parts of an aqueous binder dispersion described in DE19948004 A1, page 20, lines 9 to 21 are admixed with stirring with 4.5 parts of an acrylate-modified polyurethane resin (DE4437535 A1, page 7, line 55 to page 8, line 23), 1.8 parts of a solution of 50 parts Surfynol® 104 (Air Products) and 50 parts butyl glycol, and also 4.5 parts of the melamine resin Luwipal® 052 (BASF), 2 parts of butyl glycol, 4 parts of the polyester described in DE4009858 A1, column 16, lines 37-59, and 30 parts of a 20%, aqueous premix of the polyamide thickener Disparlon® AQ 630 in water, and a mixture of 0.75 part of the acrylate thickener Viscalex® HV30 and 0.75 part of water.

Subsequently a smoothly stirred mixture of 5.4 g of the aluminum pigment Stapa® Hydrolux 2192 (Eckart) in 8 parts of butyl glycol is added. The pH is adjusted to 8.0 with a dimethylethanolamine solution (10% strength in water) and the viscosity is adjusted to 70 mPas at 1000 s$^{-1}$ and 23° C. with water (Rheolab MC1 from Physica, Z2 measuring system).

Example 4

17.5 parts of an aqueous binder dispersion described in DE19948004 A1, page 20, lines 9 to 21 are mixed with 6 parts of a 3% aqueous dispersion of Laponite® RD. With stirring, 4.5 parts of an acrylate-modified polyurethane resin according to DE4437535 A1, page 7, line 55 to page 8, line 23, 1.8 parts of a solution of 50 parts Surfynol® 104 (Air Products) and 50 parts butyl glycol, and also 4.5 parts of the melamine resin Luwipal® 052 (BASF), 2 parts of butyl glycol, and 4 parts of the polyester described in DE4009858 A1, column 16, lines 37-59, and a mixture of 0.75 part of the acrylate thickener Viscalex® HV30 and 0.75 part of water.

Subsequently a smoothly stirred mixture of 5.4 g of the aluminum pigment Stapa®Hydrolux 2192 (Eckart) in 8 parts of butyl glycol is added. The pH is adjusted to 8.0 with a dimethylethanolamine solution (10% strength in water) and the viscosity is adjusted to 70 mPas at 1000 s$^{-1}$ and 23° C. with water (Rheolab MC1 from Physica, Z2 measuring system).

Example 5

Inventive Example 17.5 parts of an aqueous binder dispersion described in DE19948004 A1, page 20, lines 9 to 21 are mixed with 6 parts of a 3% aqueous dispersion of Laponite® RD. With stirring, 4.5 parts of an acrylate-modified polyurethane resin according to DE4437535 A1, page 7, line 55 to page 8, line 23, 1.8 parts of a solution of 50 parts Surfynol® 104 (Air Products) and 50 parts butyl glycol, and also 4.5 parts of the melamine resin Luwipal® 052 (BASF), 2 parts of butyl glycol, and 4 parts of the polyester described in DE4009858 A1, column 16, lines 37-59, and 15 parts of a 20%, aqueous premix of the polyamide thickener Disparlon® AQ 630 in water, and also a mixture of 0.75 part of the acrylate thickener Viscalex® HV30 and 0.75 part of water.

Subsequently a smoothly stirred mixture of 5.4 g of the aluminum pigment Stapa® Hydrolux 2192 (Eckart) in 8 parts of butyl glycol is added. The pH is adjusted to 8.0 with a dimethylethanolamine solution (10% strength in water) and the viscosity is adjusted to 70 mPas at 1000 s$^{-1}$ and 23° C. with water (Rheolab MC1 from Physica, Z2 measuring system).

Example 6

17.5 parts of an aqueous binder dispersion described in DE19948004 A1, page 20, lines 9 to 21 are mixed with 6 parts of a 3% aqueous dispersion of Laponite® RD. With stirring, 4.5 parts of an acrylate-modified polyurethane resin according to DE4437535 A1, page 7, line 55 to page 8, line 23, 1.8 parts of a solution of 50 parts Surfynol® 104 (Air Products) and 50 parts butyl glycol, and also 4.5 parts of the melamine resin Luwipal® 052 (BASF), 2 parts of butyl glycol, and 4 parts of the polyester described in DE4009858 A1, column 16, lines 37-59, and 30 parts of a 20%, aqueous premix of the polyamide thickener Disparlon® AQ 630 in water.

Subsequently a smoothly stirred mixture of 5.4 g of the aluminum pigment Stapa® Hydrolux 2192 (Eckart) in 8 parts of butyl glycol is added. The pH is adjusted to 8.0 with a dimethylethanolamine solution (10% strength in water) and the viscosity is adjusted to 70 mPas at 1000 s$^{-1}$ and 23° C. with water (Rheolab MC1 from Physica, Z2 measuring system).

Example 7

The preparation is carried out in the same way as for example 6, with the modification that 15 rather than 6 parts of Laponite® dispersion and 15 rather than 30 parts of Disparlon® premix are used.

Example 8

The preparation is carried out in the same way as for example 6, with the modification that 27 rather than 6 parts of Laponite® dispersion and 5 rather than 30 parts of Disparlon® premix are used.

Ib. Testing of the Coating Materials

The aqueous basecoat material obtained is coated in a film thickness of 12μ onto a metal panel measuring 30 cm×60 cm which has been coated with a commercial waterborne surfacer (e.g., SecuBloc, BASF Coatings AG), and then is subjected to preliminary drying at room temperature for 5 minutes and at 80° C. for 10 minutes. The pre-dried panel is subsequently coated with a commercial clearcoat material (e.g., Evergloss, BASF AG) and baked at 140° C. for 30 minutes.

Determination of Lightness

The hue was assessed by colorimetry. The lightness was assessed at a measurement angle of 15° (colorimetry using X-Rite MA 68 II from X-Rite).

Determination of Flop Index

The flop index is calculated from the lightness figures determined by colorimetry for the different angles of measurement, in accordance with the following formula:

$$\text{Flop Index} = 2.69(L^*_{15} - L^*_{110})^{1.11}/(L^*_{45})^{0.86},$$

where L is the lightness value measured at the respective angle of measurement (15°, 45°, and 110°).

Determination of Pinholes

In order to test the pinhole resistance, the basecoat material is coated in a wedge application, in a film thickness of 10-30 μm, onto a metal panel (30 cm×60 cm), and is then subjected to preliminary drying at room temperature for 5 minutes and at 80° C. for 10 minutes. The pre-dried metal panel is subsequently coated in a film thickness of 30-35 μm with a commercial clearcoat material (Evergloss, BASF AG) and baked at 140° C. for 30 minutes. The number of pinholes is determined visually.

Determination of Sedimentation Stability

The coating material obtained is stored in a glass vessel (diameter 5 cm, height of filling 10 cm) at 40° C. for 10 days. Subsequently the height of the supernatant above sediment is ascertained.

Results

|  | Example | 1 | 2 | 3 | 4* | 5 | 6* | 7 | 8 |
|---|---|---|---|---|---|---|---|---|---|
| Parts of rheological assistants | Laponite ® RD (3% premix) | 27.0 |  |  | 6.0 | 6.0 | 6.0 | 15.0 | 27.0 |
|  | Viscalex ® HV30 |  |  | 0.75 | 0.75 | 0.75 |  |  |  |
|  | Disparlon ® AQ 630 (20% premix) |  | 30.0 | 30.0 |  | 15.0 | 30.0 | 15.0 | 5.0 |
| Test | Lightness | 136 | 129 | 134 | 123 | 134 | 133 | 131 | 136 |
|  | Flop Index | 17 | 15 | 17 | 13 | 16 | 16 | 16 | 17 |
|  | Number of pinholes | 12 | 0 | 0 | 0 | 0 | 0 | 15 | 14 |
|  | Sedimentation in cm | 0 | 4.5 | 0 | 0 | 0 | 5 | 0 | 0 |

*inventive aqueous basecoat material

The combination of polyamide thickeners with acrylate thickeners (example 3) or the combination of polyamide thickener, poly(meth)acrylate thickener, and phyllosilicate (example 5) exhibits a good profile of properties in respect of the metallic effect (shown by lightness and flop index), resistance to pinholes, and resistance to sedimentation.

Aqueous metallic basecoat materials with phyllosilicate and polyamide as rheological assistants, without poly(meth)acrylic acids, in contrast, show increased sedimentation (example 6) and/or a high number of pinholes (examples 7 and 8).

II. Aqueous Solid-Color Basecoat Material

IIa. Preparation of the Coating Materials

Example 9

Preparation of a Pigment Paste 39 parts of a grinding binder prepared in accordance with example 1 of DE-A 4010176 are mixed with vigorous stirring with 6 parts of a commercial dispersing additive, 25 parts of water, and 30 parts of Irgazine® Red A2BN (Ciba), and the mixture is treated in a dissolver for 30 minutes and then ground in a bead mill at not more than 50° C. for 40 minutes.

Example 10

15 parts of a 3% dispersion of Laponite RD in water are admixed with stirring with 1.7 parts of an acrylate-modified polyurethane resin according to DE4437535 A1, page 7, line 55 to page 8, line 23, 1.5 parts of a solution of 50 parts of Surfynol® 104 (Air Products) and 50 parts butyl glycol, and also 29 parts of the polyurethane resin described in EP0228003 B2, page 8, lines 6-18 are added. Subsequently 5.5 parts of a commercial melamine resin (Luwipal® 052, BASF), 4.5 parts of the polyester described in DE 4009858 A1, column 16, lines 37-59, 8 parts of butyl glycol, and 1.5 parts of a 10% strength solution of dimethylethanolamine in water are added with stirring. Thereafter 18 parts of a pigment paste according to example 9 and also 2.5 parts of 2-ethylhexanol are added. The viscosity is adjusted to 90 mPas at 1000 s$^{-1}$ with water (Rheolab MC1 from Physica, Z2 measuring system).

Example 11

29 parts of the polyurethane resin described in EP0228003 B2, page 8, lines 6-18 are admixed with stirring with 1.7 parts of an acrylate-modified polyurethane resin according to DE4437535 A1, page 7, line 55 to page 8, line 23, 1.5 parts of a solution of 50 parts Surfynol® 104 (Air Products) and 50 parts butyl glycol. Subsequently 5.5 parts of a commercial melamine resin (Luwipal® 052, BASF), 4.5 parts of the polyester described in DE 4009858 A1, column 16, lines 37-59, 8 parts of butyl glycol, and 1.5 parts of a 10% strength solution of dimethylethanolamine in water are added with stirring. Thereafter 18 parts of a pigment paste according to example 9 and also 2.5 parts of 2-ethylhexanol are added. Then, with stirring, 20 parts of a 20% dispersion of Disparlon® AQ 630 in water are added, and the viscosity is adjusted to 90 mPas at 1000 s$^{-1}$ with water (Rheolab MC1 from Physica, Z2 measuring system).

Example 12

Inventive Basecoat Material 6 parts of a 3% dispersion of Laponite® RD in water are admixed with stirring with 1.7 parts of an acrylate-modified polyurethane resin according to DE4437535 A1, page 7, line 55 to page 8, line 23, 1.5 parts of a solution of 50 parts Surfynol® 104 (Air Products) and 50 parts butyl glycol, and 29 parts of the polyurethane resin described in EP0228003 B2, page 8, lines 6-18. Subsequently 5.5 parts of a commercial melamine resin (Luwipal® 052, BASF), 4.5 parts of the polyester described in DE 4009858 A1, column 16, lines 37-59, 8 parts of butyl glycol, and 1.5 parts of a 10% strength solution of dimethylethanolamine in water are added with stirring. Thereafter 18 parts of a pigment paste according to example 9 and also 2.5 parts of 2-ethylhexanol are added. Then, with stirring, 20 parts of a 20% dispersion of Disparlon® AQ630 in water are added and also a mixture of 0.5 part of the acrylate thickener Viscalex® HV30 and 0.5 part of water, and the viscosity is adjusted to 90 mPas at 1000 s$^{-1}$ with water (Rheolab MC1 from Physica, Z2 measuring system).

Example 13

Inventive Basecoat Material 29 parts of the polyurethane resin described in EP0228003 B2, page 8, lines 6-18 are admixed with stirring with 1.7 parts of an acrylate-modified polyurethane resin according to DE4437535 A1, page 7, line 55 to page 8, line 23, and 1.5 parts of a solution of 50 parts Surfynol® 104 (Air Products) and 50 parts butyl glycol. Subsequently 5.5 parts of a commercial melamine resin (Luwipal® 052, BASF)), 4.5 parts of the polyester described in DE 4009858 A1, column 16, lines 37-59, 8 parts of butyl glycol, and 1.5 parts of a 10% strength solution of dimethylethanolamine in water are added with stirring. Thereafter 18 parts of a pigment paste according to example 9 and also 2.5 parts of 2-ethylhexanol are added. Then, with stirring, 20 parts of a 20% dispersion of Disparlon® AQ630 in water are added and also a mixture of 0.5 part of the acrylate thickener Viscalex® HV30 and 0.5 part of water, and the viscosity is adjusted to 90 mPas at 1000 s$^{-1}$ with water (Rheolab MC1 from Physica, Z2 measuring system).

IIb. Testing of the Coating Materials

Determination of Pinholes

In order to test the pinhole resistance, the basecoat material is coated, in a film thickness of 10-35 μm, onto a metal panel (30 cm×60 cm), and is then subjected to preliminary drying at room temperature for 5 minutes and at 80° C. for 10 minutes. The pre-dried metal panel is subsequently coated in a film thickness of 30-35 μm with a commercial clearcoat material (Evergloss, BASF AG) and baked at 140° C. for 30 minutes. The number of pinholes is determined visually.

Evaluation of Runs

To test the run resistance, the basecoat material is coated in a film thickness of 10-35 μm to a metal panel (30 cm×60 cm) with a row of holes punched along its length, and is then subjected to preliminary drying at room temperature for 5 minutes and at 80° C. for 10 minutes in a vertical position. The pre-dried metal panel is then baked at 140° C. for 30 minutes. The film thickness at which runs form at the holes is determined visually.

Results

|  | Example | 10 | 11 | 12* | 13* |
|---|---|---|---|---|---|
| Fractions of rheological assistants | Laponite ® RD (3% premix) | 15 |  | 6 |  |
|  | Viscalex ® HV30 |  |  | 0.5 | 0.5 |
|  | Disparlon ® AQ 630 (20% premix) |  | 20 | 20 | 20 |
| Test | Number of pinholes | 120 | 0 | 0 | 0 |
|  | Run limit in μm | 20 | 28 | >35 | >35 |

*inventive

It is apparent that the inventive examples, examples 12 and 13, exhibit an optimum in terms of resistance to pinholes and running.

What is claimed is:

1. A water-based coating composition comprising
    at least one resin composition for a water-based coating composition,
    a rheological assistant comprising at least one polyamide, and
    at least one acrylate thickener based on polyacrylic acid or polymethacrylic acid, wherein the mass ratio of polyamide to acrylate thickener is 10:1 to 1.5:1 and wherein the rheological assistant is 2 to 15% by weight based on total binder solids.

2. The coating composition of claim 1, wherein the polyamide comprises the reaction product of polyamines and fatty acids.

3. The coating composition of claim 1, wherein the acrylate thickener is a polyacrylic acid.

4. The coating composition of claim 1, further comprising at least one color and/or effect pigment.

5. The coating composition claim 4, wherein the color and/or effect pigment is selected from the group consisting of organic pigments, inorganic pigments, coloring pigments, extending pigments, rheology-controlling pigments, optical-effect-imparting pigments, electrically conductive pigments, magnetically shielding pigments, fluorescent pigments, metallic pigments, organic fillers, inorganic fillers, transparent fillers, hiding fillers, nanoparticles, and combinations thereof.

6. The coating composition of claim 1 that is a basecoat material comprising a color pigment.

7. The coating composition of claim 4, wherein the color and/or effect pigment comprises a metal powder.

8. The coating composition of claim 7, wherein the metallic pigment is selected from the group consisting of aluminum, bismuth oxychloride, mica, titanium oxide-coated mica, iron oxide-coated mica, micaceous iron oxide, titanium oxide-coated silica, titanium oxide-coated aluminum, iron oxide-coated silica, and iron oxide-coated aluminum.

9. The coating composition of claim 1, comprising from 2 to 10% by mass of the rheological assistant, based on the total binder solids.

10. The coating composition of claim 9, comprising from 2 to 8% by mass of the rheological assistant, based on the total binder solids.

11. The coating composition of claim 7, comprising from 4 to 15% by mass of the rheological assistant, based on total binder solids.

12. The coating composition of claim 11, comprising from 4 to 12% by mass of the rheological assistant, based on the total binder solids.

13. The coating composition of claim 1, comprising a mass ratio of polyamide to acrylate thickener of from 7:1 to 3:1.

14. The coating composition of claim 1, comprising at least one further rheological assistant.

15. The coating composition of claim 14, wherein the at least one further rheological assistant is selected from the group consisting of polyurethane-based associative thickeners, carboxymethylcellulose acetobutyrate thickeners, metal silicate, and silica.

16. The coating composition of claim 14, comprising a mass ratio of polyamide to acrylate thickener to at least one further rheological assistant of from 12:1:1 to 1:0.5:1.

17. The coating composition of claim 1, wherein the at least one resin composition comprises a binder and a crosslinking agent, wherein the binder forms a dispersion or a solution in water.

18. A process for preparing the coating composition of claim 1, comprising mixing and dispersing the individual components comprising
    the at least one resin composition,
    the rheological assistant comprising at least one polyamide, and
    the at least one acrylate thickener based on poly(meth) acrylic acid in an aqueous medium.

19. A method of coating a substrate of an article, comprising applying the coating composition of claim 1 as a paint system on the substrate of an article that is at least one of a metal body, part, or component, or a plastic body, part, or component, wherein the body, part, or component is a least one of an automobile, a passenger car, a truck, a motorbike, a bus, and a household electrical product.

20. A water-based coating composition comprising
at least one resin composition for a water-based coating composition comprising a water-dilutable polyurethane resin and an amino resin;
a metal silicate;
a metallic effect pigment;
a rheological assistant comprising at least one polyamide and
at least one acrylate thickener based on polyacrylic acid or polymethacrylic acid, wherein the mass ratio of polyamide to acrylate thickener is 7:1 to 3:1 and wherein the rheological assistant is 2 to 15% by weight based on total binder solids.

21. The composition of claim 20 wherein the polyamide is a reaction product of a polyamine with a fatty acid.

* * * * *

UNITED STATES PATENT AND TRADEMARK OFFICE
CERTIFICATE OF CORRECTION

PATENT NO. : 8,128,744 B2
APPLICATION NO. : 12/919562
DATED : March 6, 2012
INVENTOR(S) : Ingo Lüer and Egon Wegner It is certified that error appears in the above-identified patent and that said Letters Patent is hereby corrected as shown below:

On the Title Page, Item [73] Assignee "BASF Coating GmbH" should be -- BASF Coatings GmbH --

Signed and Sealed this
Sixteenth Day of July, 2013

Teresa Stanek Rea
*Acting Director of the United States Patent and Trademark Office*